June 17, 1952      W. T. WHATLEY      2,600,820
METHOD OF REMOVING SCALE FROM HEATING COILS
Original Filed Aug. 27, 1949
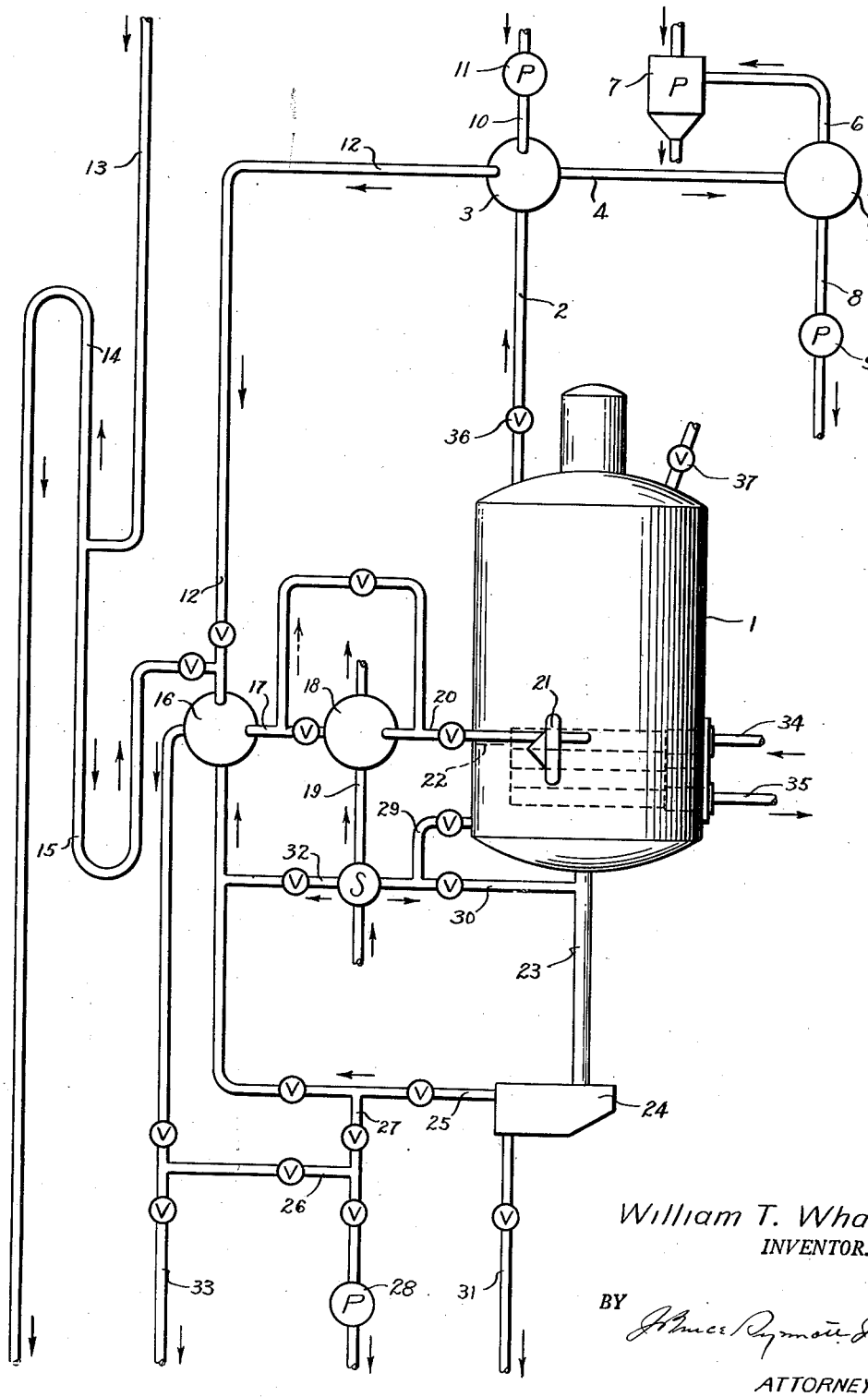
William T. Whatley
INVENTOR.
BY
ATTORNEY

UNITED STATES PATENT OFFICE 2,600,820

METHOD OF REMOVING SCALE FROM HEATING COILS

William T. Whatley, Port Arthur, Tex.

Original application August 27, 1949, Serial No. 112,755. Divided and this application July 3, 1950, Serial No. 171,927

2 Claims. (Cl. 134—17)

This application is a division of my copending application, Serial No. 112,755, filed August 27, 1949, which has been abandoned. The method of distilling sea water described herein is described and claimed in my copending application, Serial No. 182,286, filed August 30, 1950, which is a continuation-in-part of the first mentioned application.

The invention concerns certain improvements which have been incorporated in a system for distilling sea water as hereinafter described. It involves a novel method for removing scale which is deposited on the heating coils as evaporation of the brine proceeds.

An object of the invention is to provide a speedy and effective method for removing scale deposits from the heating coils of the evaporator, in systems of the type described. Methods which have been devised heretofore for that purpose have been time consuming and of doubtful efficiency, ordinarily involving a complete shutdown of the equipment for a period of several hours.

The invention will be readily understood by referring to the following description and the accompanying drawing, the single figure of which is a diagrammatic view in elevation illustrating apparatus suitable for carrying out the process of the invention.

Referring to the drawing, a combined evaporator and dephlegmator 1 is provided which is connected by a vapor line 2 to a condenser 3. Condensate from the condenser 3 is delivered by line 4 to an accumulator drum 5. The vapor space of the accumulator drum 5 is connected by line 6 to a jet pump 7 whereby the system is maintained under vacuum. Usually aboard steamships a vacuum line is available in connection with the ship's main power plant, such vacuum line being the equivalent of the jet pump 7. Liquid is withdrawn from the accumulator drum 5 thru line 8 by the action of pump 9.

A portion of the charge to the process is cold sea water, which is first passed in heat exchange relation with vapors delivered to the condenser 3, being delivered to the condenser 3 thru line 10 by the action of pump 11. Aboard ship there is usually a sanitary line which may be used as a convenient source of cold salt water under pressure, the sanitary line being the equivalent of the line 10 and the pump 11. The partially heated charge is withdrawn from condenser 3 by line 12 and at this point it is combined with a second portion of charge which may consist of partially heated sea water which has been heated by using it as cooling water in the condensers of the ship's main power plant or the auxiliary power plant, the latter being introduced to the process thru line 13. A water leg 14 is provided whereby a portion of the condenser water moving thru the line 13 may be collected for use in the process, the remainder going overboard. A liquid seal 15 is provided in the line 13 to prevent air from being drawn into the system due to failure of the condenser water supply. The combined charge is delivered to a heat exchanger 16 where it is passed in heat exchange relation with hot brine withdrawn from the evaporator 1 as hereinafter described. The combined charge, after being heated by heat interchange with the hot brine, is withdrawn from the heat exchanger 16 by line 17 and delivered to a heater 18 where it is further heated as necessary by steam delivered to the heater 18 thru line 19. The heater 18 may be bypassed with all or part of the charge if desired. The heated charge is delivered to the evaporator 1 thru line 20, a liquid level regulator 21 being provided to maintain a constant level in the evaporator 1 as indicated by the dotted line 22.

A portion of the hot brine is continuously discharged from the evaporator 1 thru line 23. The line 23 delivers the brine to a scale trap 24, where the solid material is settled out. The brine is withdrawn from the scale trap 24 thru line 25 and delivered to the heat exchanger 16 where it is used to heat a portion of the charge as above described. Thereafter it is discharged overboard, preferably below the water line, thru lines 26 and 27 by the action of pump 28. Alternatively a jet pump may be substituted for the pump 28, cold salt water under pressure, as from the sanitary line, being used to activate the jet pump. Use of a jet pump is preferable as it eliminates leakage of air into the system, thus preventing air locks which interfere with operation of the pumps.

Steam may be delivered to the evaporator 1 and the line 23 thru lines 29 and 30 for use in removing scale from the heating coils as hereinafter described and for cleaning the scale trap 24. A line 31 is provided for discharging the contents of the scale trap 24 overboard during cleaning, the line 25 being bypassed during this operation. Similarly, steam may be delivered to the heat exchanger 16 thru line 32. A line 33 is provided for discharging the contents of the heat exchanger 16 overboard during cleaning, the heat exchanger 16 being bypassed and the line 25 being connected directly to line 27 during this operation.

The evaporator and dephlegmator 1 comprises a vertically disposed cylindrical vessel which is divided by a baffle (not shown) into an upper section and a lower section. Vapors are generated in the lower section and the vapors are dephlegmated in the upper section. A bundle of heating tubes, indicated by dotted lines, is provided in the lower section of the vessel 1. A steam supply line 34 and a steam discharge line 35 are connected to the heating tubes. A valve 36 is disposed in the vapor line 2, and the evaporator and dephlegmator 1 is provided with a pressure relief valve 37.

The method of removing the scale involves shock treatment of the scale by subjecting it alternately to extremes of temperature as well as pressure as hereinafter described.

The valve 36 is closed and pressure is allowed to build up in the vessel 1. After a pressure of about 30 pounds, for example, has been generated within the vessel 1 the charge line 20 is closed, the line 25 is bypassed, and the line 31 is opened whereby the contents of the vessel 1 as well as the scale trap 24 are discharged overboard by the accumulated pressure. The line 31 is then closed and the heating coils are further dried by admitting steam to the vessel 1 thru line 29, the valve 36 being opened and the evaporator 1 being under vacuum. Cold sea water is then drawn into the vessel 1 thru the line 31 by the action of the applied vacuum, the cold water cooling the outside of the heating coils while the inside thereof is being heated vigorously with steam. The cycle is repeated several times, the entire operation being completed within a relatively short time.

The invention may be modified in various ways without departing from the spirit and scope thereof.

I claim:

1. The method of removing scale from the heating coils in an evaporator which comprises maintaining a body of water in the evaporator, heating the body of water while confining the generated water vapor whereby a superatmospheric pressure is generated within the evaporator, exhausting the contents of the evaporator, drying the outside of the coils while maintaining the evaporator under subatmospheric pressure, thereafter drawing cold water into the evaporator while heating the inside of the coils.

2. The method of removing scale from the heating coils in an evaporator which comprises maintaining a body of water in the evaporator, heating the body of water while confining the generated water vapor whereby a superatmospheric pressure is generated within the evaporator, exhausting the contents of the evaporator by action of the accumulated pressure, drying the outside of the coils by direct application of steam thereto while maintaining the evaporator under subatmospheric pressure, thereafter drawing cold water into the evaporator by action of the subatmospheric pressure while heating the inside of the coils, and repeating the cycle one or more times.

WILLIAM T. WHATLEY.

No references cited.